(12) United States Patent
Guan et al.

(10) Patent No.: US 10,785,531 B2
(45) Date of Patent: Sep. 22, 2020

(54) VIDEO SYNOPSIS METHOD AND RELATED VIDEO SYNOPSIS DEVICE

(71) Applicant: VIVOTEK INC., New Taipei (TW)

(72) Inventors: Jian-Nan Guan, New Taipei (TW); Pei-Hsien Lin, New Taipei (TW)

(73) Assignee: VIVOTEK INC., New Taipei (TW)

( * ) Notice: Subject to any disclaimer, the term of this patent is extended or adjusted under 35 U.S.C. 154(b) by 41 days.

(21) Appl. No.: 16/226,650

(22) Filed: Dec. 20, 2018

(65) Prior Publication Data

US 2019/0200075 A1 Jun. 27, 2019

(30) Foreign Application Priority Data

Dec. 21, 2017 (TW) .............................. 106144995 A (51) Int. Cl.
*H04N 21/44* (2011.01)
*G06K 9/62* (2006.01)
*H04N 21/431* (2011.01)
*G06K 9/00* (2006.01)

(52) U.S. Cl.
CPC ... *H04N 21/44008* (2013.01); *G06K 9/00758* (2013.01); *G06K 9/6202* (2013.01); *H04N 21/4318* (2013.01); *H04N 21/44016* (2013.01)

(58) Field of Classification Search
CPC .............. G06K 9/6202; G06K 9/00758; H04N 21/4318; H04N 21/44008; H04N 21/44016; H04N 21/8549; H04N 17/002; H04N 19/44; H04N 5/2258; H04N 5/783; H04N 9/8205; G06T 2200/32; G06T 3/4038; G06T 5/009; G06T 5/40; G06T 5/50; G11B 27/005; G11B 27/034; G11B 27/309
See application file for complete search history.

(56) References Cited

U.S. PATENT DOCUMENTS

2016/0133297 A1* 5/2016 Thornton ................. H04N 7/18
386/230

FOREIGN PATENT DOCUMENTS

| CN | 102222104 A | 10/2011 |
|----|-------------|---------|
| CN | 102708182 A | 10/2012 |
| CN | 103345492 A | 10/2013 |
| TW | 201519649 A | 5/2015  |

\* cited by examiner

*Primary Examiner* — Omar S Parra
(74) *Attorney, Agent, or Firm* — Winston Hsu (57) ABSTRACT

A video synopsis method for overlapping videos generated in different periods is applied to a video synopsis device. The video synopsis method includes dividing a monitoring film into a plurality of videos, acquiring a pixel difference between frames respectively from the plurality of videos at identical time sequence, acquiring a weighting parameter according to the pixel difference, and utilizing the weighting parameter to overlap the frames respectively from the plurality of videos so as to generate a composite frame.

15 Claims, 7 Drawing Sheets

VIDEO SYNOPSIS METHOD AND RELATED VIDEO SYNOPSIS DEVICE

BACKGROUND OF THE INVENTION

1. Field of the Invention

The present invention relates to a video synopsis method and a related video synopsis device, and more particularly, to a video synopsis method for overlapping videos generated in different periods and a related video synopsis device.

2. Description of the Prior Art

A monitoring apparatus applied to a public road or a storehouse has to continuously record a video about a monitoring region for preventing missing any abnormal event. The time length of the monitoring video may have hundreds of hours; when the abnormal event happened, the user has a high speed playback of the monitoring video in order to check the monitoring video in a short time. A drawback of the high speed playback is that an object inside the frame moves fast, so that the user may miss a clue in response to failure of mind. The user cannot browse the high speed playback for a long time, and has to take a rest periodically therefore investigation efficiency is decreased accordingly. Design of a video analyzing method capable of condensing the time length of the monitoring video and showing all frames of the monitoring video in a short time period is an important issue in the related monitoring industry.

SUMMARY OF THE INVENTION

The present invention provides a video synopsis method for overlapping videos generated in different time periods and a related video synopsis device for solving above drawbacks.

According to the claimed invention, a video synopsis method for overlapping videos generated in different periods includes dividing a monitoring film into a plurality of videos, acquiring a pixel difference between frames respectively from the plurality of videos at the same time sequence of each video, acquiring a weighting parameter according to the pixel difference, and utilizing the weighting parameter to overlap the frames respectively from different videos so as to generate a composite result.

According to the claimed invention, a video synopsis device with a function of overlapping videos generated in different periods includes an video receiver and an operation processor. The video receiver is adapted to receive a monitoring film. The operation processor is electrically connected to the video receiver. The operation processor is adapted to divide a monitoring film into a plurality of videos, acquire a pixel difference between frames respectively from the plurality of videos at the same time sequence of each video, acquire a weighting parameter according to the pixel difference, and utilize the weighting parameter to overlap the frames respectively from different videos so as to generate a composite result, for condensing the plurality of videos of the monitoring film into a composite video.

The video synopsis method and the related video synopsis device of the present invention can condense the long-term monitoring film into the short-term composite video. The object within the frames can be overlapped via the mask acquired by the video tracking technology or the weighting acquired by the video difference generated in different periods for composition process. Each composite frame of the composite video can simultaneously show several patterns of the object within the frames of the monitoring film captured in different periods, so as to increase investigation efficiency when having a playback of the monitoring film.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
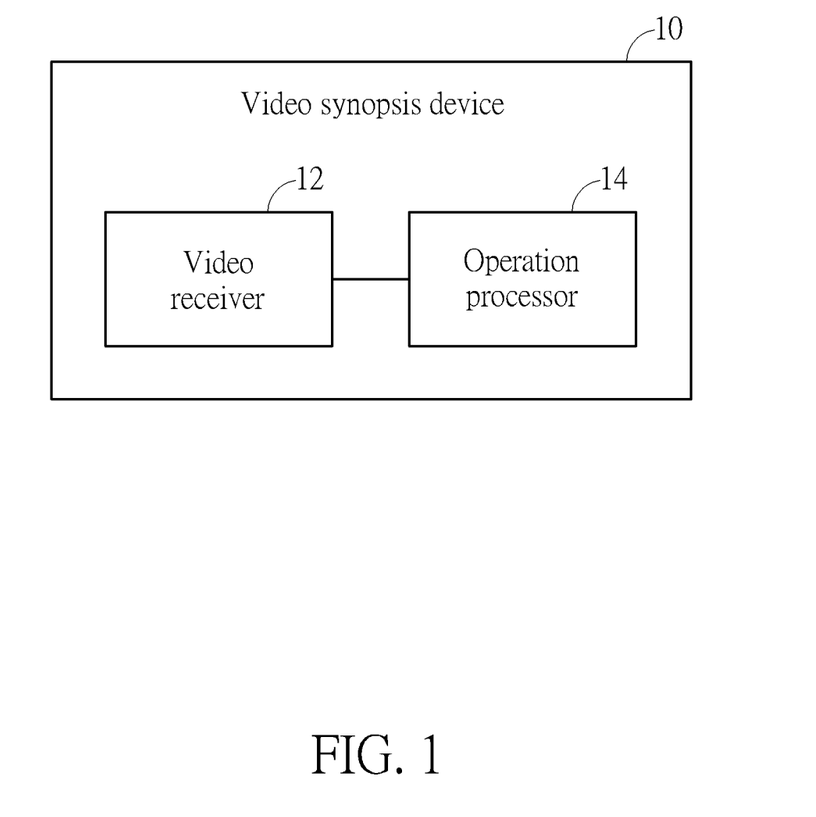
FIG. 1 is a functional block diagram of a video synopsis device according to an embodiment of the present invention.
Figure 2:
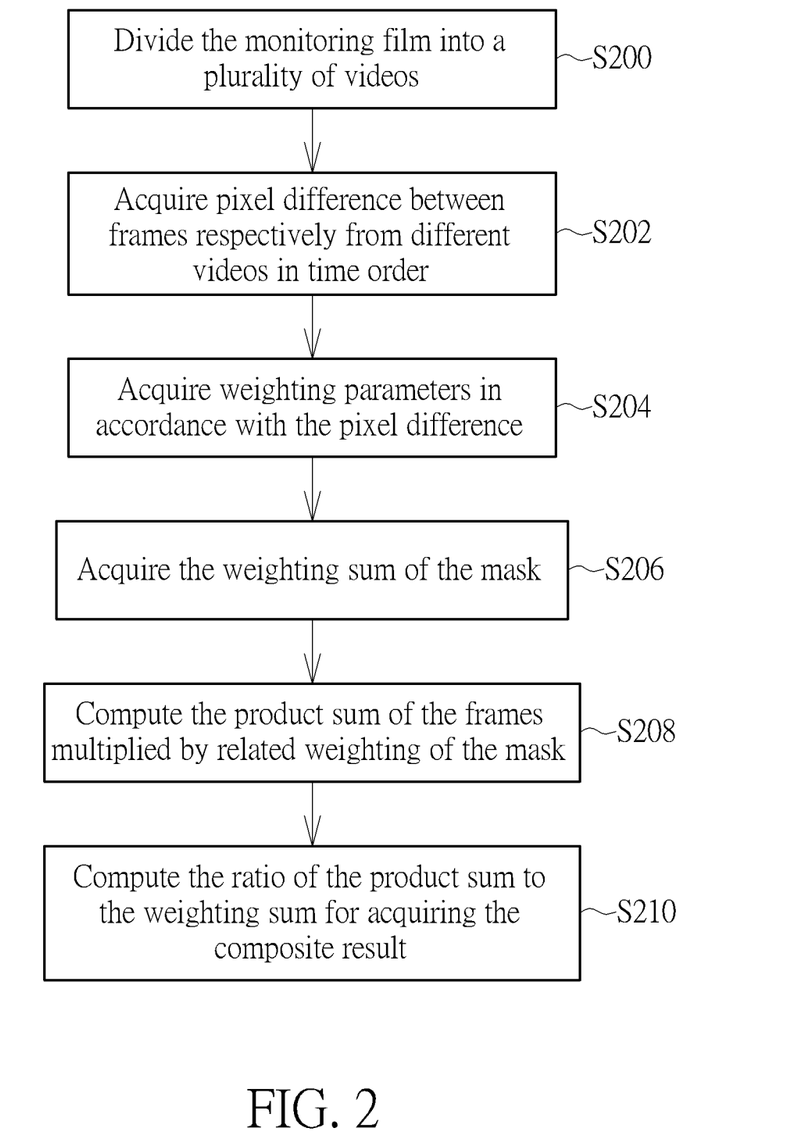
FIG. 2 is a flow chart of a video synopsis method according to the embodiment of the present invention.

Please refer to FIG. 1 and FIG. 2. FIG. 1 is a functional block diagram of a video synopsis device 10 according to an embodiment of the present invention. FIG. 2 is a flow chart of a video synopsis method according to the embodiment of the present invention. The video synopsis method illustrated in FIG. 2 can be suitable for the video synopsis device 10 shown in FIG. 1. The video synopsis device 10 can include a video receiver 12 and an operation processor 14 electrically connected to each other. The video receiver 12 can be used to receive a monitoring film. The operation processor 14 can execute the video synopsis method according to the monitoring film, such as condensing a plurality of videos within the monitoring film into a composite video. In the present invention, the video synopsis method can divide the monitoring film into several videos in time order, and overlap the foresaid videos generated in different periods, so that the user can quickly browse the monitoring film.

Figure 3:
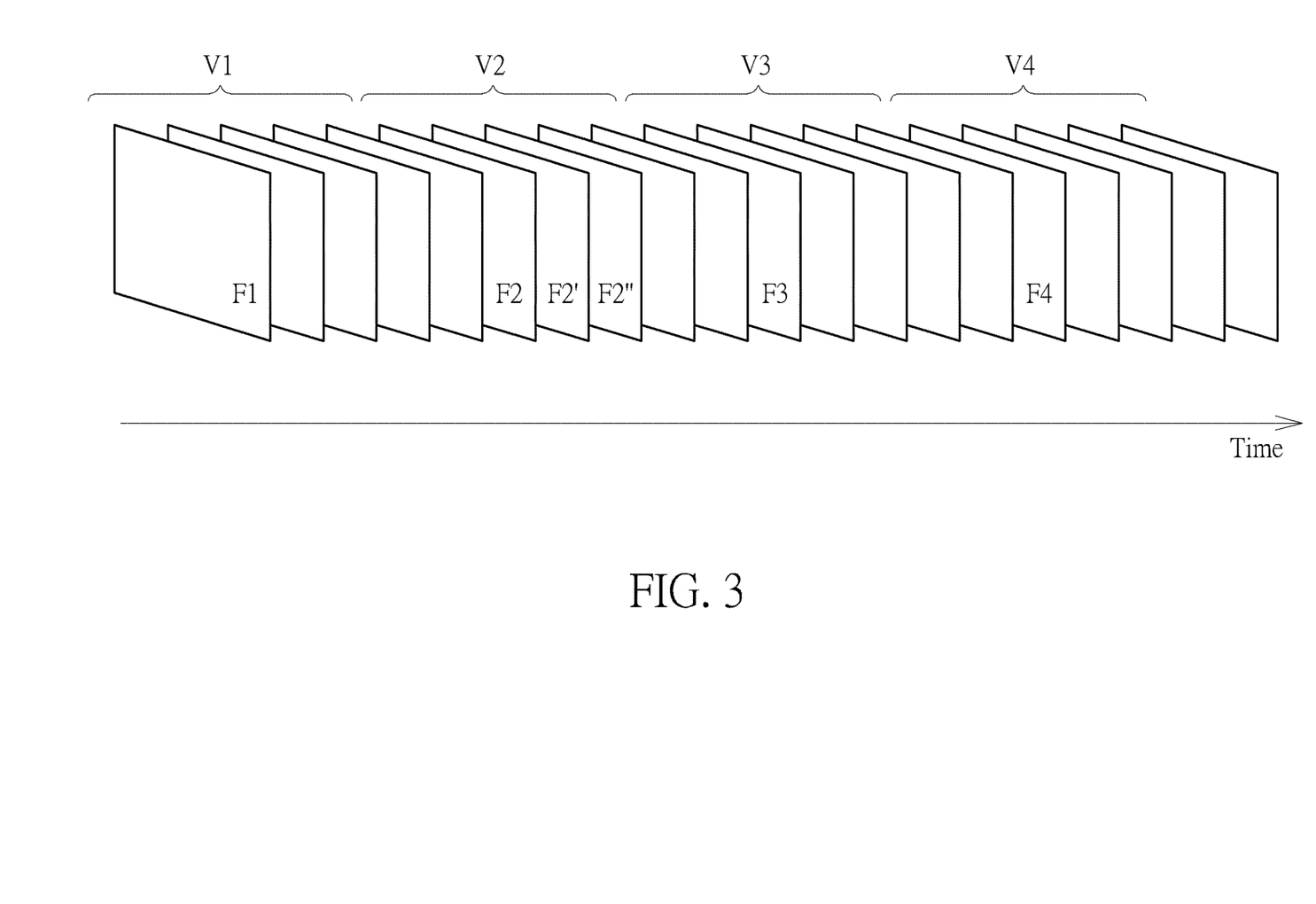
FIG. 3 is a diagram of the monitoring film according to the embodiment of the present invention.
Figure 4:
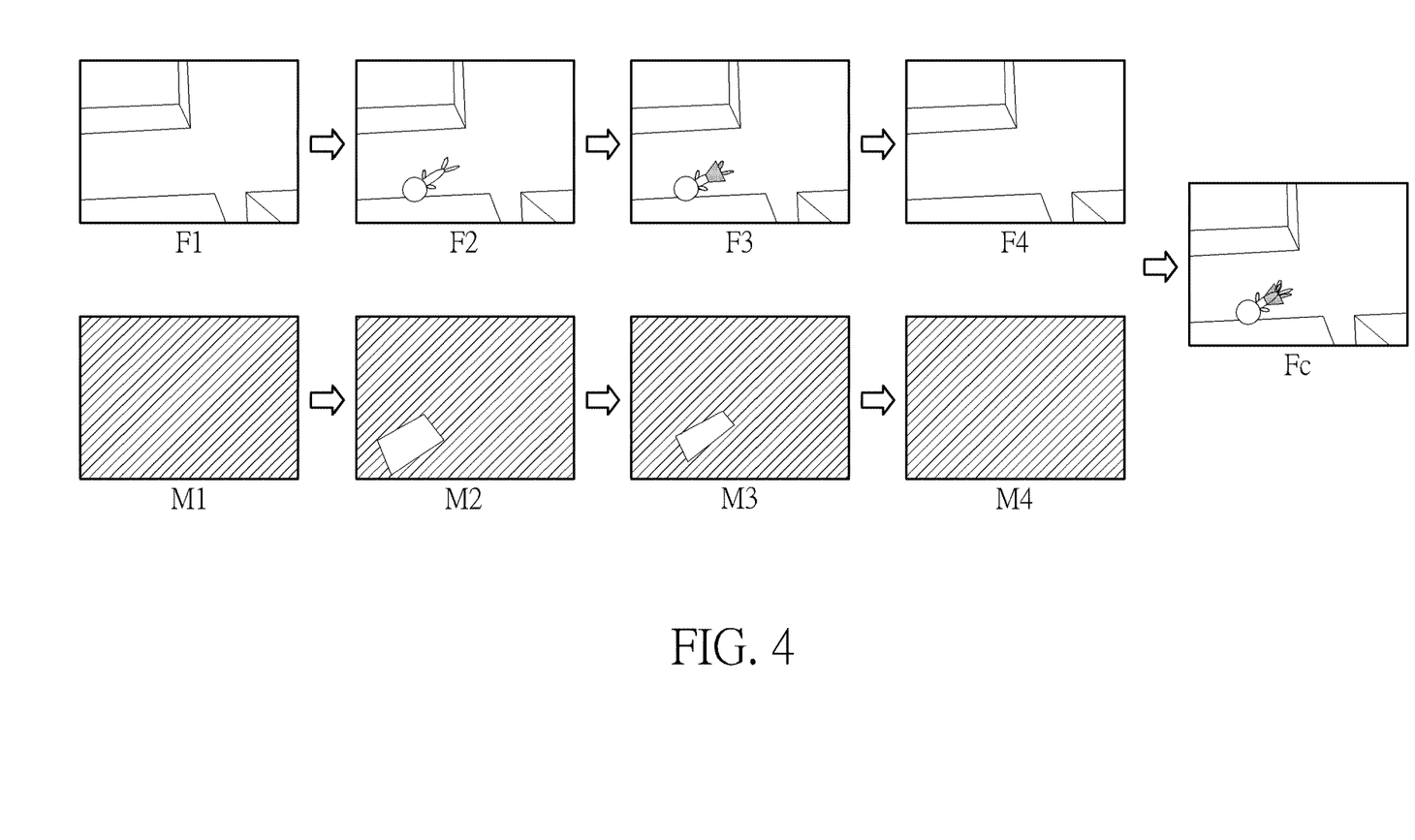
FIG. 4 is a diagram of video frames generated in different period according to the embodiment of the present invention.

Please refer to FIG. 2 to FIG. 4. FIG. 3 is a diagram of the monitoring film according to the embodiment of the present invention. FIG. 4 is a diagram of video frames generated in different period according to the embodiment of the present invention. In respect of the video synopsis method, step S200 can be executed to divide the monitoring film into the plurality of videos by the operation processor 14, and the plurality of videos can be videos V1, V2, V3 and V4. The monitoring film preferably can be divided into at least three videos. In this embodiment, the monitoring film is divided into four videos, and certainly an amount of the videos depends on an actual demand. All the video has the same time length. Then, steps S202 and S204 can be executed that the operation processor 14 acquires at least one pixel difference between frames F1, F2, F3 and F4 respectively from the videos V1, V2, V3 and V4 at the same time sequence of each video, and acquires weighting parameters in accordance with the pixel difference between the foresaid frames.

In the embodiment, the weighting parameter can be a mask generated by the pixel difference result. The weighting parameter can be computed by an external computer device or the video synopsis device 10. The mask can be used to indicate whether an object is in the frame. For example, a pixel of the mask which corresponds to the object within the frame can have a first weighting, and a pixel of the mask which does not correspond to the object within the frame can have a second weighting. The first weighting can be equal to 1 and the second weighting can be equal to 0. As shown in FIG. 4, the frames F1 and F4 do not have the object (such as a human being), so that all pixels of the masks M1 and M4 can have the second weighting (which is shown by a slash area); the frames F2 and F3 have the object, so that pixels of the masks M2 and M3 corresponding to the object within the frames F2 and F3 can have the first weighting (which is shown by a space area) and other pixels not corresponding to the object can have the second weighting.

For a start, the monitoring film can be divided into n number of videos. A symbol $I_k$ can be represented as a pixel within the k-th video related to a timing t and coordinates (x, y), such as the formula 1. A computation symbol of the mask M can be represented by $a_k$, such as the formula 2, and used to indicate the weighting within the k-th video related to the timing t and the coordinates (x, y). Parameters k and n are positive integers. Steps S206, S208 and S210 can be executed that the operation processor 14 acquires a weighting sum a of all weightings inside the mask via the formula 3 and the weighting sum a is not smaller than 1, and computes a product sum of the frames F1, F2, F3 and F4 respectively multiplied by corresponding weighting of the masks M1, M2, M3 and M4 via the formula 4, and computes a ratio of the product sum to the weighting sum a for acquiring a composite result S. It should be mentioned that the symbol $I_k$ can belong to a pixel of a specific frame within the k-th video, and the composite result S can be generated by utilizing the mask to overlap pixels on specific positions of the corresponding frames from every video in time order, which means the video synopsis device 10 can composite pixels on all positions of the frames and then the composite frame Fc and the composite video (which is not shown in figures) including the plurality of videos can be generated.

$$I_k(x, y, t), k \in (1, n) \quad \text{Formula 1}$$

$$a_k(x, y, t) = \begin{cases} 1 \\ 0 \end{cases} \quad \text{Formula 2}$$

$$\sigma = \max\left(1, \sum_{k=1}^{n} a_k\right) \quad \text{Formula 3}$$

$$S = \left[I_1\left(\sigma - \sum_{k=2}^{n} a_k\right) + \sum_{k=2}^{n} I_k a_k\right] / \sigma \quad \text{Formula 4}$$

For example, the monitoring film of the prevent invention may have sixty minutes, and each of the four videos may be equal to fifteen minutes. For example, the video V1 can include fifteen minutes from 00:00 to 14:59, and the video V2 can include fifteen minutes from 15:00-29:59, and the video V3 can include fifteen minutes from 30:00-44:59, and the video V4 can include fifteen minutes from 45:00-59:59. The corresponding frame from every video in time order can be the frame F1 at a time 00:00, the frame F2 at a time 15:00, the frame F3 at a time 30:00, and the frame F4 at a time 45:00, which means the frames are captured at the same time sequence within the corresponding video. Each pixel of the frame F1 can be overlapped with the corresponding pixels of the frames F2, F3 and F4 via the formula 3 and the formula 4 to acquire the composite result S, and a plurality of composite results S can be acquired and have an amount the same as the pixel number of the frame. The plurality of composite results S can be used to generate the composite frame Fc and the composite video.

As shown in FIG. 4, the frame F2 has a passerby wearing pants, and the frame F3 has a passerby wearing a skirt, and the frames F1 and F4 have no passerby. The video synopsis method of the present invention can merge the frames F1, F2, F3 and F4 to generate the composite frame Fc having a pattern of the passerby wearing the pants overlapped with the passerby wearing the skirt, and a time length of the composite video has fifteen minutes. An effect of the composite frame Fc may be varied in accordance with parameters of the mask. For example, if a range of the first weighting inside the mask M3 does not match a dimension of the object, such as the passerby wearing the skirt, an upper body of the passerby wearing the skirt inside the frame Fc will be filtered. The range of the first weighting inside the mask M3 can be enlarged to cover all pixels of the passerby wearing the skirt for overcoming the above-mentioned situation, and a detailed description about adjusting the weighting range is omitted herein for simplicity. In addition, the video synopsis method may optionally blur the mask after execution of step S204. The blurred mask can be used to overlap the corresponding frames from the videos generated in different periods for effectively smoothing a contour of the object within the composite result S, the composite frame Fc and the composite video, which means the overlapping pattern (the passerby wearing the pants and the passerby wearing the skirt) and background can be merged in a color gradient manner.

Figure 5:
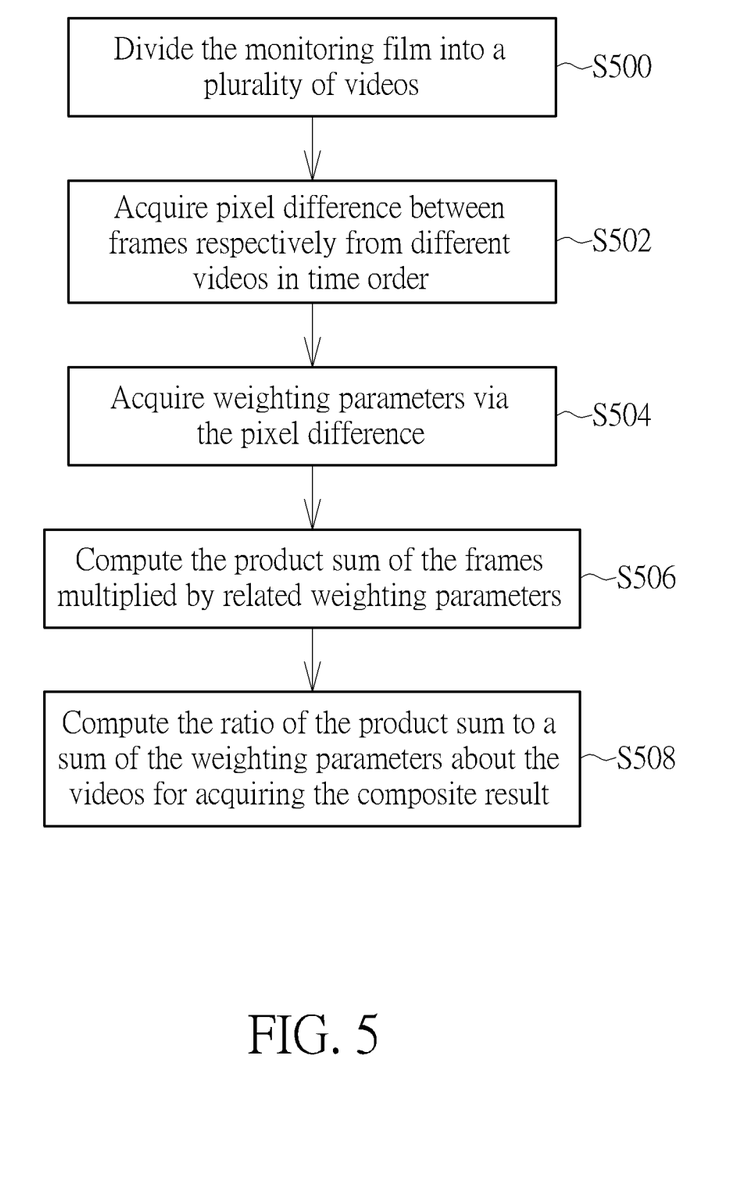
FIG. 5 is a flow chart of the video synopsis method according to another embodiment of the present invention.
Figure 6:
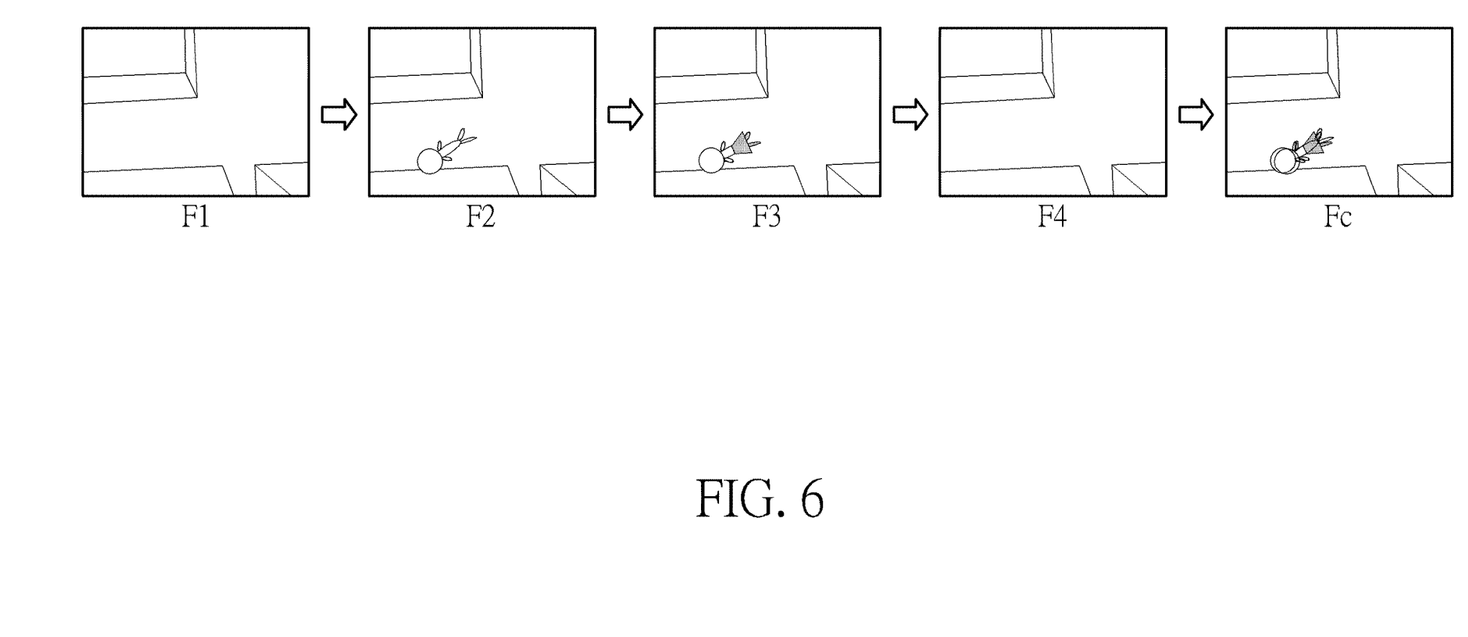
FIG. 6 is a diagram of the video frames generated in different periods according to another embodiment of the present invention.

Please refer to FIG. 3, and FIG. 5 to FIG. 6. FIG. 5 is a flow chart of the video synopsis method according to another embodiment of the present invention. FIG. 6 is a diagram of the video frames generated in different periods according to another embodiment of the present invention. The video synopsis method illustrated in FIG. 5 is suitable for the video synopsis device 10 shown in FIG. 1. First, steps S500, S502 and S504 can be executed that the operation processor 14 divides the monitoring film into the plurality of videos V1, V2, V3 and V4, and acquires the pixel difference between the frames F1, F2, F3 and F4 respectively from the videos V1, V2, V3 and V4 in time order, and acquires the weighting parameters via the pixel difference between different frames. In this embodiment, the pixel difference can be a video difference $d_k$ between each video and other videos within the plurality of videos via the formula 5, and a difference value $d_k'$ between the video difference $d_k$ of each video and a minimal video difference about other videos can be acquired via the formula 6, and the difference value $d_k'$ can be optionally transformed into the weighting parameter $w_k$ via normalization process as the formula 7. Parameters p and q can be arbitrary numbers. Parameters k, n and j can be positive integers.

Generally, the difference value $d_k'$ computed by the formula 6 can be the weighting parameter, however the present invention can further plus the difference value $d_k'$ and an adjusting value ε (which is a minimum but not zero) to prevent a sum of the weighting parameter about the n number of videos from being zero, as mentioned by the formula 7. Then, the video synopsis method can execute steps S506 and S508 to compute the product sum of the frames respectively from different videos multiplied by the corresponding weighting parameters, and then compute the ratio of the product sum to the sum of the weighting parameters of the plurality of videos for acquiring the composite result S. As the embodiment mentioned above, the composite result S is merged by specific pixels respectively from the frames F1, F2, F3 and F4, and the video synopsis method can acquire the plurality of composite results S about all pixels within the frame for generating the composite frame Fc and the composite video.

$$d_k = \left(\sum_{j=1}^{n} |I_k - I_j|^p\right)^q \quad \text{Formula 5}$$

$$d'_k = d_k - \min_{l \le k \le n} d_k \quad \text{Formula 6}$$

$$w_k = d'_k + \varepsilon, \varepsilon = 1 - \min\left(1, \left|\sum_{k=1}^{n} d'_k\right|\right) \quad \text{Formula 7}$$

$$S = \sum_{k=1}^{n} I_k w_k \bigg/ \sum_{k=1}^{n} w_k \quad \text{Formula 8}$$

Figure 7:
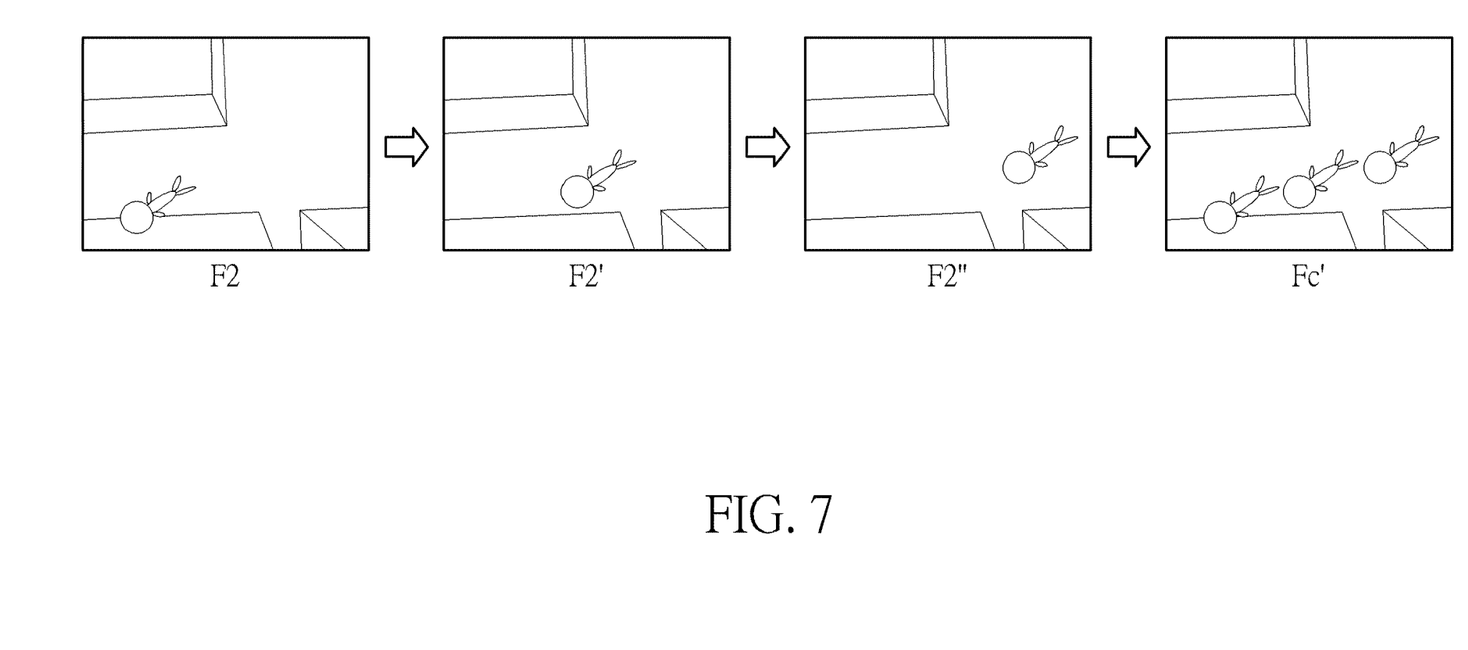
FIG. 7 is a diagram of a composition about the series of frames according to another embodiment of the present invention.

The video synopsis method of the present invention not only can overlap the plurality of videos generated in different time periods, but also can merge a series of frames acquired by motion detection into the single composite frame. Please refer to FIG. 3, FIG. 4 and FIG. 7 FIG. 7 is a diagram of a composition about the series of frames according to another embodiment of the present invention. As shown in FIG. 4, the video V2 captures the passerby wearing the pants walks inside the monitoring region, and the first frame F2, the second frame F2' and the third frame F2" can be the series of frames captured at different timing and respectively record steps of a moving trace about the passerby wearing the pants. The video synopsis method of the present invention can utilize the weighting parameter acquired by the mask or the video difference of the above-mentioned embodiments to overlap the frames F2, F2' and F2" for generating the composite frame. As shown in FIG. 7, the single composite frame Fc' can show the passerby wearing the pants walks from left to right.

In conclusion, the video synopsis method and the related video synopsis device of the present invention can condense the long-term monitoring film into the short-term composite video. The object within the frames can be overlapped via the mask acquired by the video tracking technology or the weighting acquired by the video difference generated in different periods for composition process. Each composite frame of the composite video can simultaneously show several patterns of the object within the frames of the monitoring film captured in different periods, so as to increase investigation efficiency when having a playback of the monitoring film.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video synopsis method for overlapping videos generated in different periods, the video synopsis method comprising:
    dividing a monitoring film into a plurality of videos;
    acquiring a pixel difference between frames respectively from the plurality of videos at the same time sequence of each video;
    acquiring a weighting parameter according to the pixel difference; and
    utilizing the weighting parameter to overlap the frames respectively from different videos so as to generate a composite result;
    wherein the pixel difference is a video difference between each video and other videos within the plurality of videos, and the video synopsis method acquires a difference value between the video difference and a minimal video difference about other videos and then transforms the difference value into a corresponding weighting parameter of each video;
    wherein the monitoring film is divided into n number of videos, $I_k(x, y, t)$ is represented as a pixel within a K-th video related to a timing t and coordinates (x, y), the video difference is represented as $$d_k = \left(\sum_{j=1}^{n} |I_k - I_j|^p\right)^q,$$

parameters p and q are arbitrary numbers, the difference value is represented as $$d'_k = d_k - \min_{l \le k \le n} d_k,$$

and parameters k, n, j are positive integers.

2. The video synopsis method of claim 1, wherein the monitoring film is divided into at least three videos, each video of the monitoring film has a time length identical with a time length of another video of the monitoring film.

3. The video synopsis method of claim 1, wherein the weighting parameter is a mask generated by the pixel difference result, a pixel of the mask corresponding to an object within each frame has a first weighting, and a pixel of the mask not corresponding to the object within each frame has a second weighting.

4. The video synopsis method of claim 3, wherein the monitoring film is divided into n number of videos, $I_k(x, y, t)$ is represented as a pixel within a K-th video related to a timing t and coordinates (x, y), the mask is represented as $$a_k(x, y, t) = \begin{cases} 1 \\ 0 \end{cases},$$

so that the first weighting is 1 and the second weighting is 0, and parameters k and n are positive integers.

5. The video synopsis method of claim 3, wherein utilizing the weighting parameter to overlap the frames respectively from different videos so as to generate the composite result comprises:
    acquiring a weighting sum of the mask, wherein the weighting sum is not smaller than 1;
    computing a product sum of the frames multiplied by corresponding weightings of the mask; and
    computing a ratio of the product sum to the weighting sum for acquiring the composite result.

6. The video synopsis method of claim 5, wherein the weighting sum is represented as $$\sigma = \max\left(1, \sum_{k=1}^{n} a_k\right),$$

and the composite result is represented as $$S = \left[I_1\left(\sigma - \sum_{k=2}^{n} a_k\right) + \sum_{k=2}^{n} I_k a_k\right]\Big/\sigma.$$

7. The video synopsis method of claim 3, wherein the video synopsis method blurs the mask, and uses the burred mask to overlap the frames respectively from the videos generated in different periods for smoothing the composite result.

8. The video synopsis method of claim 1, wherein the difference value is transformed into the corresponding weighting parameter via normalization process, and utilizing the weighting parameter to overlap the frames respectively from different videos so as to generate the composite result comprises:
computing a product sum of the frames respectively multiplied by the corresponding weighting parameter; and
computing a ratio of the product sum and a sum of the weighting parameters of the plurality of videos for acquiring the composite result.

9. The video synopsis method of claim 8, wherein the corresponding weighting parameter is represented as $$w_k = d'_k + \varepsilon, \varepsilon = 1 - \min\left(1, \left[\sum_{k=1}^{n} d'_k\right]\right),$$

and the composite result is represented as $$S = \sum_{k=1}^{n} I_k w_k \Big/ \sum_{k=1}^{n} w_k.$$

10. A video synopsis device with a function of overlapping videos generated in different periods, the video synopsis device comprising:
a video receiver adapted to receive a monitoring film; and
an operation processor electrically connected to the video receiver, and adapted to divide a monitoring film into a plurality of videos, acquire a pixel difference between frames respectively from the plurality of videos at the same time sequence of each video, acquire a weighting parameter according to the pixel difference, and utilize the weighting parameter to overlap the frames respectively from different videos so as to generate a composite result, for condensing the plurality of videos of the monitoring film into a composite video;
wherein the pixel difference is a video difference between each video and other videos within the plurality of videos, and the video synopsis method acquires a difference value between the video difference and a minimal video difference about other videos and then transforms the difference value into a corresponding weighting parameter of each video;
wherein the monitoring film is divided into n number of videos, $I_k(x, y, t)$ is represented as a pixel within a K-th video related to a timing t and coordinates (x, y), the video difference is represented as $$d_k = \left(\sum_{j=1}^{n} |I_k - I_j|^p\right)^q,$$

parameters p and q are arbitrary numbers, the difference value is represented as $$d'_k = d_k - \min_{1 \leq k \leq n} d_k,$$

and parameters k, n, j are positive integer.

11. The video synopsis device of claim 10, wherein the monitoring film is divided into at least three videos, each video of the monitoring film has a time length identical with a time length of another video of the monitoring film.

12. The video synopsis device of claim 10, wherein the weighting parameter is a mask generated by the pixel difference result, a pixel of the mask corresponding to an object within each frame has a first weighting, and a pixel of the mask not corresponding to the object within each frame has a second weighting.

13. The video synopsis device of claim 12, wherein the operation processor is further adapted to acquire a weighting sum of the mask, compute a product sum of the frames multiplied by corresponding weightings of the mask, and compute a ratio of the product sum to the weighting sum for acquiring the composite result, the weighting sum is not smaller than 1.

14. The video synopsis device of claim 12, wherein the video synopsis method blurs the mask, and uses the burred mask to overlap the frames respectively from the videos generated in different periods for smoothing the composite result.

15. The video synopsis device of claim 10, wherein the difference value is transformed into the corresponding weighting parameter via normalization process, and the operation processor is further adapted to compute a product sum of the frames respectively multiplied by the corresponding weighting parameter and compute a ratio of the product sum and a sum of the weighting parameters of the plurality of videos for acquiring the composite result.

* * * * *